United States Patent
Li et al.

(10) Patent No.: US 11,502,960 B2
(45) Date of Patent: Nov. 15, 2022

(54) METHOD AND MODULE OF PRIORITY DIVISION AND QUEUE SCHEDULING FOR COMMUNICATION SERVICES IN SMART SUBSTATION

(71) Applicant: Wuhan University, Wuhan (CN)

(72) Inventors: Jun'e Li, Wuhan (CN); Qiuyu Lu, Wuhan (CN); Yangrong Chen, Wuhan (CN); Hai Lin, Wuhan (CN); Yu Xia, Wuhan (CN); Fuyang Li, Wuhan (CN)

(73) Assignee: WUHAN UNIVERSITY, Wuhan (CN)

( * ) Notice: Subject to any disclaimer, the term of this patent is extended or adjusted under 35 U.S.C. 154(b) by 0 days.

(21) Appl. No.: 17/330,391

(22) Filed: May 25, 2021

(65) Prior Publication Data
US 2021/0367895 A1    Nov. 25, 2021

(30) Foreign Application Priority Data
May 25, 2020   (CN) .......................... 202010450544.3

(51) Int. Cl.
| | | |
|---|---|---|
| *H04L 47/2441* | (2022.01) | |
| *H04L 47/24* | (2022.01) | |
| *H04L 47/30* | (2022.01) | |
| *H04L 47/62* | (2022.01) | |
| *H04L 47/6275* | (2022.01) | |
| *H04L 47/32* | (2022.01) | |

(52) U.S. Cl.
CPC ...... *H04L 47/2441* (2013.01); *H04L 47/2458* (2013.01); *H04L 47/30* (2013.01); *H04L 47/623* (2013.01); *H04L 47/6275* (2013.01); *H04L 47/32* (2013.01)

(58) Field of Classification Search
CPC . H04L 47/2441; H04L 47/2458; H04L 47/30; H04L 47/623
See application file for complete search history.

(56) References Cited

U.S. PATENT DOCUMENTS

| | | | | |
|---|---|---|---|---|
| 6,424,622 B1 * | 7/2002 | Fan | ..................... | H04Q 11/0478 370/395.41 |
| 9,065,763 B2 * | 6/2015 | Kasztenny | ............. | H04L 45/30 |

FOREIGN PATENT DOCUMENTS

WO    WO-2021114494 A1 *    6/2021    ............. H04L 47/22

* cited by examiner

*Primary Examiner* — Siming Liu
(74) *Attorney, Agent, or Firm* — Matthias Scholl P.C.; Matthias Scholl

(57) ABSTRACT

A method for dividing communication services in smart substation into different priorities, the method including: determining the priority of a message to be sent according to the service type and its priority definition; the communication services includes trip message, state change message, sampled value message, device status message, time synchronization message, and file transfer message; the corresponding priority is respectively defined as 7, 6, 5, 4, 3, 1; and filling the user priority field of IEEE802.1Q label in a message header with a binary value corresponding to its priority.

2 Claims, 2 Drawing Sheets

METHOD AND MODULE OF PRIORITY DIVISION AND QUEUE SCHEDULING FOR COMMUNICATION SERVICES IN SMART SUBSTATION

CROSS-REFERENCE TO RELATED APPLICATIONS

Pursuant to 35 U.S.C. § 119 and the Paris Convention Treaty, this application claims foreign priority to Chinese Patent Application No. 202010450544.3 filed May 25, 2020, the contents of which, including any intervening amendments thereto, are incorporated herein by reference. Inquiries from the public to applicants or assignees concerning this document or the related applications should be directed to: Matthias Scholl P. C., Attn.: Dr. Matthias Scholl Esq., 245 First Street, 18th Floor, Cambridge, Mass. 02142.

BACKGROUND

The disclosure belongs to the field of communication technology for smart substation, and in particular, to a priority scheme of communication services in smart substation, a queue scheduling method for the priority scheme, a sending module, and a forwarding module.

The further development of the smart grid puts forward the requirement of unified networking for all communication services in the smart substation. That is, the structure of the communication network in the smart substation develops towards the mode that all intelligent electronic devices (IED) in the station are connected to the same network. This networking construction maximizes information sharing and improves network efficiency, but increases the uncertainty of network load and network delay at the same time. When the smart substation meets system disturbance or network attacks, the burst traffic may cause network congestion, thus making switches become the bottleneck of the network, and the network quality of service (QoS) decreases. Burst traffic will lead to the communication delay of key service increases, affect the action behavior of sensitive equipment, and eventually affect the safe and stable operation of the power grid. Therefore, how to ensure the real-time and reliability of key services under network congestion is a problem that must be solved when there is just one network in the smart substation.

IEC61850 gives preliminary suggestions that messages within the station use IEEE802.1Q priority tags to give different priority levels, while in the current actual project, two-level priority is adopted by default. The services carried by Generic Object Oriented Substation Event (GOOSE) messages and Sampled Value (SV) messages are set as high priority 4. And the remaining services are set as low priority 1. Switches use Strict Priority Queue (SPQ) algorithm to schedule messages. However, in the smart substation, different types of services have different real-time requirements, and service failure also causes varying degree damage to a primary power system. The two-level priority and SPQ scheduling strategy lack more detailed research on distinguishing services according to their different characteristics, and thus are difficult to guarantee the real-time and reliability of key services in case of network congestion.

SUMMARY

In view of the above-described problems, the disclosure provides a priority scheme of communication services in the smart substation, a queue scheduling method for the priority scheme, a sending module, and a forwarding module. The sending module can be integrated into the terminal equipment of the smart substation, such as breaker IED, P&C IED, MU IED, station PC, etc., and the forwarding module can be integrated into the switches used in smart substation.

In the first aspect, a method for dividing communication services in smart substation into different priorities comprises:

(a1) determining the priority of a message to be sent according to the service type and its priority definition; the communication services comprise trip message, state change message, sampled value message, device status message, time synchronization message, and file transfer message; the corresponding priority is respectively defined as 7, 6, 5, 4, 3, 1; and (a2) filling the user priority field of IEEE802.1Q label in a message header with a binary value corresponding to its priority.

In the second aspect, the queue scheduling method for the priority scheme comprises:

(b1) initializing each queue, and setting a buffer size for each queue;

(b2) reading a packet from the receive buffer of switch, and putting the packet into the corresponding queue according to its priority; and (b3) scheduling and outputting the packet according to HDWRR scheduling rule.

In the third aspect, the sending module comprises a processing unit and a sending unit, wherein the processing unit is configured to determine the priority of message to be sent according to the service type and its priority definition; and the sending unit is configured to fill the user priority field of IEEE802.1Q label in the message header with a binary value corresponding to its priority, and send the message.

In the fourth aspect, the forwarding module comprises a configuration unit, a receiving unit, and a scheduling unit:

the configuration unit is configured to initialize each queue, and set a buffer size for each queue;

the receiving unit is configured to receive a packet p, and put the packet p into the corresponding queue according to its priority; and the scheduling unit is configured to schedule and output packets according to HDWRR scheduling rule.

The disclosure has the following advantages and benefits:

(1) By using a fine-grained priority scheme based on services, the switches allocate network resources more reasonably according to the real-time and reliability requirements of all kinds of services in the communication network of the smart substation.

(2) HDWRR queue scheduling method is a combination of SPQ and Deficit Weight Round Robin (DWRR), which improves the ability to resist traffic attacks in the communication network, and ensures the Quality of Service (QoS) requirements of key service.

(3) The HDWRR queue scheduling method is universality. Users set the queue weight as a constant value according to the actual needs of users or a dynamic value according to different network conditions. The HDWRR queue scheduling method is suitable for the industrial network, which carries both real-time and non-real-time services. And the real-time services have different QoS requirements.

DETAILED DESCRIPTION

To facilitate the understanding and implementation of the disclosure by persons of ordinary skill in the art, the disclosure will be further described in detail below with reference to the accompanying drawings and examples. It should be understood that embodiments described herein are merely used for illustrating and explaining the invention rather than limiting the invention.

Figure 1:
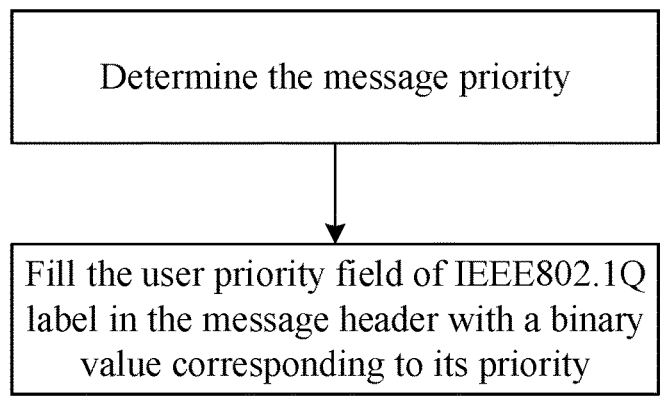
FIG. 1 shows a flow chart of priority scheme of communication service in smart substation.

Referring to FIG. 1, a priority scheme of communication services in the smart substation comprises:

(a1) determining the priority of a message to be sent according to the service type and its priority definition; the communication services comprise trip message, state change message, sampled value message, device status message, time synchronization message, and file transfer message; the corresponding priority is respectively defined as 7, 6, 5, 4, 3, 1; in the described embodiment, the message to be sent is a trip command with priority t=7; and (a2) filling the user priority field of IEEE802.1Q label in a message header with a binary value 111 corresponding to its priority.

Figure 2:
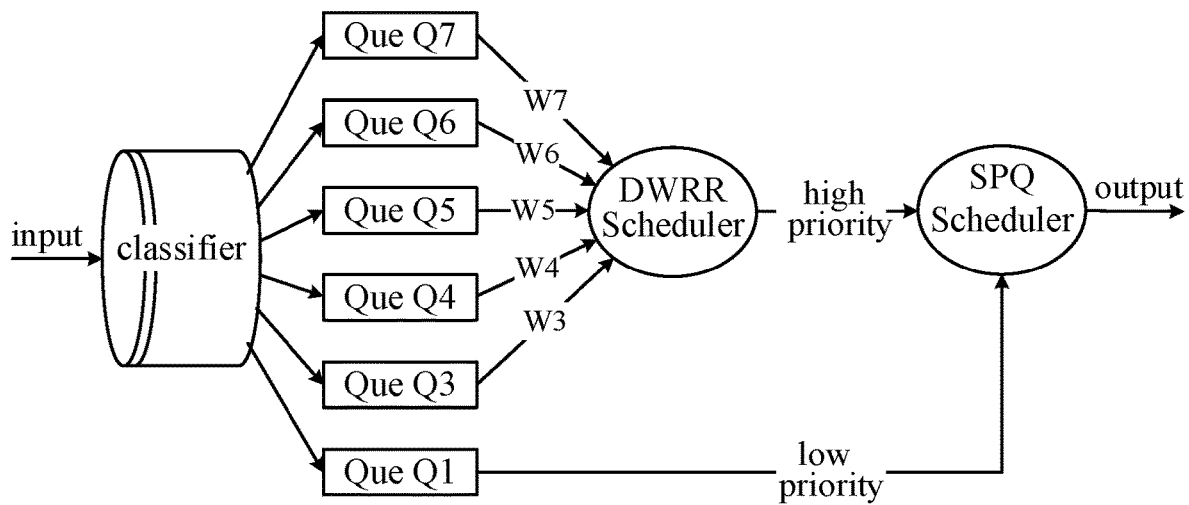
FIG. 2 shows an overall structure of the HDWRR queue scheduling method for the priority scheme.

Referring to FIG. 2, a HDWRR queue scheduling method for the priority scheme comprises:

(b1) initializing each queue, and setting a buffer size for each queue;

in b1), setting six first in first out (FIFO) queues, and marking each queue as $Q_1$, $Q_3$, $Q_4$, $Q_5$, $Q_6$, $Q_7$ in the order of priority from low to high; wherein the buffer space of each queue PerqueSize=BufferSize/6, where BufferSize represents the buffer space size of the output port; in the described embodiment, BufferSize=1.5 Mb;

(b2) reading a packet from the receive buffer of switch, and putting the packet into the corresponding queue according to its priority; and (b3) scheduling and outputting a packet according to HDWRR scheduling rule b2) further comprises:

(b2.1) checking the user priority field of IEEE802.1Q label, and converting the binary value in the field to decimal value t, when a packet p arrives; in the described embodiment, t=7;

(b2.2) if t>7, setting the value of t to 7; if t<1, setting the value of t to 1; and (b2.3) if PacketSize+QueSize≤PerqueSize, put p into $Q_t$; otherwise, discarding p; wherein, PacketSize is the length of packet p, and QueSize is the current length of $Q_t$.

b3) further comprises:

(b3.1) Checking whether there are packets waiting for scheduling in $Q_3$-$Q_7$, when the first packet puts into $Q_i$, or the head-of-line packet in $Q_i$ has just been processed and forwarded; if so, scheduling $Q_3$-$Q_7$ according to deficit weight round robin (DWRR) scheduling rule, and outputting packet p'; otherwise, going to step (b3.2); for each $Q_i$ participating in DWRR scheduling, the weight $W_i$, the service quantum $X_i$, and the value of the counter $DC_i$ are preset; where, 3≤i≤7, $W_i$ is a constant value according to the actual needs of users or a dynamic value according to different network conditions, where $X_i=\rho W_i$, $\rho$ is a positive integer, and $DC_i=0$; in the described embodiment, $W_i=i-2$, and $\rho=100$; and (b3.2) if $Q_1$ is not empty, scheduling it according to the arrival order of packets, and outputting a packet p"; in the meantime, monitoring whether there are packets waiting for scheduling in $Q_3$~$Q_7$; if so, going to b3.1); otherwise, going to step (b3.2).

Figure 3:
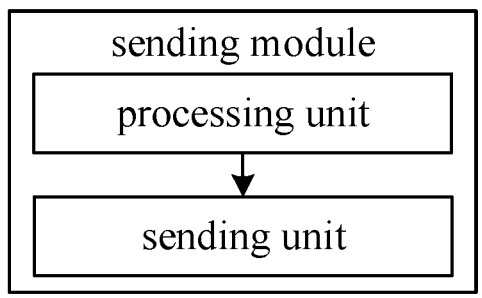
FIG. 3 shows a structure chart of the sending module.

Referring to FIG. 3, a sending module comprises a processing unit and a sending unit. The sending module is based on the embodiment of the priority scheme, and can be integrated into the terminal equipment of the smart substation, such as breaker IED, P&C IED, MU IED, station PC, etc.

The processing unit is configured to determine the priority of message to be sent according to the service type and its priority definition. The communication services comprise trip message, state change message, sampled value message, device status message, time synchronization message, and file transfer message. The corresponding priority is respectively defined as 7, 6, 5, 4, 3, 1. In the described embodiment, the message to be sent is a trip command with priority t=7.

The sending unit is configured to fill the user priority field of IEEE802.1Q label in the message header with a binary value 111 corresponding to its priority, and send the message.

Figure 4:
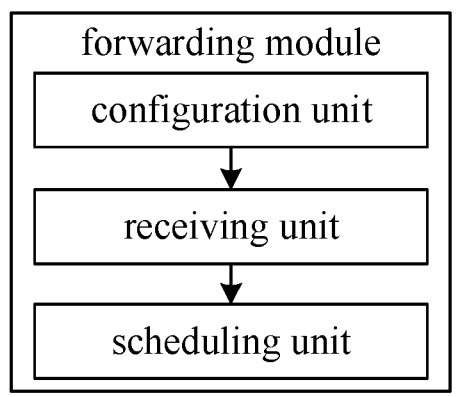
FIG. 4 shows a structure chart of the forwarding module.

Referring to FIG. 4, a forwarding module comprises a configuration unit, a receiving unit and a scheduling unit. The forwarding module is based on the embodiment of the HDWRR queue scheduling method, and can be integrated into the switches used in smart substation.

The configuration unit is configured to initialize each queue, and set the buffer size for each queue, wherein:

1) six first in first out (FIFO) queues are set and marked as $Q_1$, $Q_3$, $Q_4$, $Q_5$, $Q_6$, $Q_7$ in the order of priority from low to high; and 2) the buffer size of each queue PerqueSize=BufferSize/6, where BufferSize represents the buffer space size of the output port. In the described embodiment, BufferSize=1.5 Mb.

The receiving unit is configured to receive a packet p, and put the packet p into the corresponding queue according to its priority, wherein:

1) when the packet p arrives, the user priority field of IEEE802.1Q label in the packet is checked, and the binary value in the field is converted to decimal value t; if t>7, setting the value of t to 7, if t<1, setting the value of t to 1. In the described embodiment, t=7; and 2) if PacketSize+QueSize≤PerqueSize, p is put into $Q_t$ and queued up for scheduling; otherwise, p is discarded; wherein PacketSize is the length of p, and QueSize is the current length of $Q_t$; and The scheduling unit is configured to schedule and output packets according to HDWRR scheduling rule, wherein the HDWRR scheduling rule comprises: checking whether there are packets waiting for scheduling in $Q_3$~$Q_7$, when the first packet puts into $Q_i$, or the head-of-line packet in $Q_i$ has just been processed and forwarded; if so, scheduling $Q_3$-$Q_7$ according to deficit weight round robin (DWRR) scheduling rule, and outputting packet p'; otherwise, scheduling $Q_1$ according to the arrival order of packets, and outputting a packet p"; while scheduling $Q_1$, monitoring whether there are packets waiting for scheduling in $Q_3$~$Q_7$; if so, scheduling $Q_3$-$Q_7$ immediately; otherwise, scheduling $Q_1$ continuously.

It is worth noting that, for each queue $Q_i$ participating in DWRR scheduling, the weight $W_i$, the service quantum $X_i$, and the value of the counter $DC_i$ are preset; where 3≤i≤7, $W_i$ is a constant value according to the actual needs of users or a dynamic value according to different network conditions, $X_i=\rho W_i$, $\rho$ is a positive integer, and $DC_i=0$. In the described embodiment, $W_i=i-2$, and $p=100$.

It will be obvious to those skilled in the art that changes and modifications may be made, and therefore, the aim in the appended claims is to cover all such changes and modifications.

What is claimed is:

1. A queue scheduling method for a priority scheme, the method comprising:
   (b1) setting seven first in first out (FIFO) queues, and marking each queue as $Q_1$, $Q_2$, $Q_3$, $Q_4$, $Q_5$, $Q_6$, $Q_7$ in an order of priority from low to high; a buffer space size of each queue being PerqueSize=BufferSize/7, wherein BufferSize is a buffer space size of an output port;
   (b2) reading a packet from a receive buffer of a switch, and putting the packet into one of the queues according to (b2.1), (b2.2), and (b2.3):
      (b2.1) checking an user priority field of IEEE802.1Q label, and converting a binary value in the field to a decimal value t, when a packet p arrives; and
      b2.2) if t>7, setting the value of t to 7; if t<1, setting the value of t to 1; and
      (b2.3) if PacketSize+QueSize≤PerqueSize, putting the packet p into $Q_t$; otherwise, discarding the packet p; wherein PacketSize is a length of the packet p, and QueSize is a current length of $Q_t$; and
   (b3) scheduling and outputting the packet according to (b3.1) and (b3.2):
      (b3.1) checking whether there are packets waiting for scheduling in $Q_2$-$Q_7$, when a first packet puts into $Q_i$, or a head-of-line packet in $Q_i$ has just been processed and forwarded; if so, scheduling $Q_2$-$Q_7$ according to deficit weight round robin (DWRR) scheduling rule, and outputting packet p'; otherwise, going to (b3.2); for each $Q_i$ participating in DWRR scheduling, a weight $W_i$, a service quantum $X_i$, and a value of a counter $DC_i$ are preset; wherein i is an integer, and 2≤i≤7, $W_i$ is a constant value according to actual needs of users or a dynamic value according to different network conditions, where $X_i=\rho W_i$, $\rho$ is a positive integer, and $DC_i=0$; and
      (b3.2) if $Q_1$ is not empty, scheduling it according to an arrival order of packets, and outputting a packet p''; in the meantime, monitoring whether there are packets waiting for scheduling in $Q_2$-$Q_7$; if so, going to step (b3.1); otherwise, going to step (b3.2).

2. A forwarding module for being integrated into switches used in a smart substation, the forwarding module comprising a configuration unit, a receiving unit, and a scheduling unit, wherein:
   the configuration unit is configured to initialize each queue, and to set a buffer space size for each queue according to 1) and 2):
   1) seven first in first out (FIFO) queues are set, and marked as $Q_1$, $Q_2$, $Q_3$, $Q_4$, $Q_5$, $Q_6$, $Q_7$ in an order of priority from low to high, and
   2) a buffer space size of each queue is set to be PerqueSize=BufferSize/7, BufferSize represents a buffer space size of an output port;
   the receiving unit is configured to receive a packet p, and to put the packet p into one of the queues according to (1) and (2):
   (1) when the packet p arrives, a user priority field of IEEE802.1Q label in the packet is checked, and a binary value in the field is converted to decimal value t; if t>7, setting the value of t to 7; if t<1, setting the value of t to 1, and
   (2) if PacketSize+QueSize≤PerqueSize, the packet p is put into $Q_t$; otherwise, the packet p is discarded; wherein PacketSize is a length of the packet p, and QueSize is a current length of $Q_t$;
   the scheduling unit is configured to schedule and output packets according to a rule comprising:
      checking whether there are packets waiting for scheduling in $Q_2$-$Q_7$, when a first packet puts into $Q_i$, or a head-of-line packet in $Q_i$ has just been processed and forwarded;
   if so, scheduling queue $Q_2$-$Q_7$ according to deficit weight round robin (DWRR) scheduling rule, and outputting packet p'; otherwise, scheduling $Q_1$ according to an arrival order of packets, and outputting a packet p''; while scheduling $Q_1$, monitoring whether there are packets waiting for scheduling in $Q_2$-$Q_7$; if so, scheduling $Q_2$-$Q_7$ immediately; otherwise, scheduling $Q_1$ continuously.

* * * * *